United States Patent
Nelken et al.

(10) Patent No.: US 7,099,855 B1
(45) Date of Patent: Aug. 29, 2006

(54) SYSTEM AND METHOD FOR ELECTRONIC COMMUNICATION MANAGEMENT

(75) Inventors: Yoram Nelken, Jerusalem (IL); Israel Nelken, Jerusalem (IL); Nissan Hajaj, Jerusalem (IL); Josemina Magdalen, Jerusalem (IL); Michael Bluger, Jerusalem (IL); Dani Cohen, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 09/754,179

(22) Filed: Jan. 3, 2001

Related U.S. Application Data

(60) Provisional application No. 60/176,411, filed on Jan. 13, 2000.

(51) Int. Cl.
*G06F 17/00* (2006.01)
*G06N 5/02* (2006.01)

(52) U.S. Cl. .............................. 706/50; 706/14; 706/47

(58) Field of Classification Search .................. 706/50, 706/909, 14, 21, 47, 46, 55; 709/206, 202; 704/9, 236, 255; 382/159; 707/10, 3; 705/26; 717/104, 105
See application file for complete search history.

(56) References Cited

U.S. PATENT DOCUMENTS

| | | | |
|---|---|---|---|
| 3,648,253 A | 3/1972 | Mullery et al. | |
| 4,286,322 A | 8/1981 | Hoffman et al. | |
| 4,642,756 A | 2/1987 | Sherrod | |
| 4,658,370 A | 4/1987 | Erman et al. | |
| 4,805,107 A | 2/1989 | Kieckhafer et al. | |
| 4,814,974 A | 3/1989 | Narayanan et al. | |
| 4,942,527 A | 7/1990 | Schumacher | |
| 5,018,215 A * | 5/1991 | Nasr et al. ................... | 382/155 |
| 5,040,141 A | 8/1991 | Yazima et al. | |

(Continued)

FOREIGN PATENT DOCUMENTS

CA          2180392    *    2/2001

(Continued)

OTHER PUBLICATIONS

Morelli et al; Predicting Technical Communication in Product Development Organizations; IEEE Transactions on Engineering Management; vol. 42, Iss. 3; Aug. 1995; pp. 215-222.*

(Continued)

*Primary Examiner*—Joseph P. Hirl
(74) *Attorney, Agent, or Firm*—Gates & Cooper LLP

(57) ABSTRACT

A system and method for electronic communication management comprises a universal data model, a modeling engine, and an adaptive knowledge base. The modeling engine includes a natural language processor and a statistical modeler. A communication is translated from its native format into the universal data model. The modeling engine determines the intent of the communication using the natural language processor and the statistical modeler. A response is generated, either automatically or by an agent. An audit module analyzes each response and provides feedback to the modeling engine and the adaptive knowledge base. The modeling engine uses the feedback to update models in the adaptive knowledge base. The modeling engine supports various application specific modules.

77 Claims, 4 Drawing Sheets

U.S. PATENT DOCUMENTS

| | | | | |
|---|---|---|---|---|
| 5,067,099 A | * | 11/1991 | McCown et al. | 702/183 |
| 5,068,789 A | | 11/1991 | van Vliembergen | |
| 5,099,425 A | * | 3/1992 | Kanno et al. | 704/9 |
| 5,101,349 A | * | 3/1992 | Tokuume et al. | 704/9 |
| 5,210,872 A | | 5/1993 | Ferguson et al. | |
| 5,228,116 A | | 7/1993 | Harris et al. | |
| 5,230,054 A | | 7/1993 | Tamura | |
| 5,247,677 A | | 9/1993 | Welland et al. | |
| 5,251,131 A | * | 10/1993 | Masand et al. | 704/9 |
| 5,265,033 A | | 11/1993 | Vajk et al. | |
| 5,311,583 A | | 5/1994 | Friedes et al. | |
| 5,321,608 A | | 6/1994 | Namba et al. | |
| 5,325,526 A | | 6/1994 | Cameron et al. | |
| 5,369,570 A | | 11/1994 | Parad | |
| 5,371,807 A | * | 12/1994 | Register et al. | 382/159 |
| 5,377,354 A | | 12/1994 | Scannell et al. | |
| 5,437,032 A | | 7/1995 | Wolf et al. | |
| 5,444,820 A | * | 8/1995 | Tzes et al. | 706/21 |
| 5,483,466 A | | 1/1996 | Kawahara et al. | |
| 5,487,100 A | | 1/1996 | Kane | |
| 5,493,677 A | * | 2/1996 | Balogh et al. | 707/104.1 |
| 5,493,692 A | | 2/1996 | Theimer et al. | |
| 5,526,521 A | | 6/1996 | Fitch et al. | |
| 5,542,088 A | | 7/1996 | Jennings, Jr. et al. | |
| 5,559,710 A | | 9/1996 | Shahraray et al. | |
| 5,596,502 A | | 1/1997 | Koski et al. | |
| 5,630,128 A | | 5/1997 | Farrell et al. | |
| 5,636,124 A | | 6/1997 | Rischar et al. | |
| 5,687,384 A | | 11/1997 | Nagase | |
| 5,694,616 A | | 12/1997 | Johnson et al. | |
| 5,701,400 A | * | 12/1997 | Amado | 706/45 |
| 5,715,371 A | * | 2/1998 | Ahamed et al. | 706/10 |
| 5,745,652 A | * | 4/1998 | Bigus | 706/14 |
| 5,745,736 A | | 4/1998 | Picart | |
| 5,754,671 A | * | 5/1998 | Higgins et al. | 382/101 |
| 5,761,631 A | | 6/1998 | Nasukawa | |
| 5,765,033 A | * | 6/1998 | Miloslavsky | 709/206 |
| 5,832,220 A | | 11/1998 | Johnson et al. | |
| 5,835,682 A | * | 11/1998 | Broomhead et al. | 706/14 |
| 5,864,848 A | | 1/1999 | Horvitz et al. | |
| 5,867,495 A | * | 2/1999 | Elliott et al. | 370/352 |
| 5,878,385 A | * | 3/1999 | Bralich et al. | 704/9 |
| 5,878,386 A | | 3/1999 | Coughlin | |
| 5,890,142 A | * | 3/1999 | Tanimura et al. | 706/12 |
| 5,940,612 A | | 8/1999 | Brady et al. | |
| 5,944,778 A | | 8/1999 | Takeuchi et al. | |
| 5,948,058 A | * | 9/1999 | Kudoh et al. | 709/206 |
| 5,963,447 A | * | 10/1999 | Kohn et al. | 700/49 |
| 5,974,465 A | | 10/1999 | Wong | |
| 5,995,513 A | | 11/1999 | Harrand et al. | |
| 5,999,932 A | | 12/1999 | Paul | |
| 5,999,990 A | | 12/1999 | Sharrit et al. | |
| 6,006,221 A | * | 12/1999 | Liddy et al. | 707/5 |
| 6,021,403 A | | 2/2000 | Horvitz et al. | |
| 6,035,104 A | | 3/2000 | Zahariev | |
| 6,058,389 A | | 5/2000 | Chandra et al. | |
| 6,061,709 A | | 5/2000 | Bronte | |
| 6,064,971 A | * | 5/2000 | Hartnett | 706/46 |
| 6,067,565 A | | 5/2000 | Horvitz | |
| 6,070,149 A | | 5/2000 | Tavor et al. | |
| 6,092,095 A | | 7/2000 | Maytal | |
| 6,098,047 A | * | 8/2000 | Oku et al. | 705/7 |
| 6,112,126 A | * | 8/2000 | Hales et al. | 700/29 |
| 6,115,734 A | | 9/2000 | Mansion | |
| 6,138,139 A | * | 10/2000 | Beck et al. | 709/202 |
| 6,148,322 A | | 11/2000 | Sand et al. | |
| 6,151,538 A | | 11/2000 | Bate et al. | |
| 6,161,130 A | | 12/2000 | Horvitz et al. | |
| 6,182,059 B1 | | 1/2001 | Angotti et al. | |
| 6,182,120 B1 | | 1/2001 | Beaulieu et al. | |
| 6,185,603 B1 | | 2/2001 | Henderson et al. | |
| 6,199,103 B1 | | 3/2001 | Sakaguchi et al. | |
| 6,212,544 B1 | | 4/2001 | Borkenhagen et al. | |
| 6,223,201 B1 | | 4/2001 | Reznak | |
| 6,226,630 B1 | | 5/2001 | Billmers | |
| 6,243,735 B1 | | 6/2001 | Imanishi et al. | |
| 6,256,773 B1 | * | 7/2001 | Bowman-Amuah | 717/121 |
| 6,260,058 B1 | | 7/2001 | Hoenninger et al. | |
| 6,282,565 B1 | | 8/2001 | Shaw et al. | |
| 6,301,602 B1 | | 10/2001 | Ueki | |
| 6,308,197 B1 | | 10/2001 | Mason et al. | |
| 6,314,446 B1 | | 11/2001 | Stiles | |
| 6,327,581 B1 | | 12/2001 | Platt | |
| 6,360,243 B1 | | 3/2002 | Lindsley et al. | |
| 6,370,526 B1 | * | 4/2002 | Agrawal et al. | 707/5 |
| 6,377,949 B1 | | 4/2002 | Gilmour | |
| 6,408,277 B1 | * | 6/2002 | Nelken | 705/9 |
| 6,411,947 B1 | | 6/2002 | Rice et al. | |
| 6,411,982 B1 | | 6/2002 | Williams | |
| 6,418,458 B1 | | 7/2002 | Maresco | |
| 6,421,066 B1 | * | 7/2002 | Sivan | 715/712 |
| 6,424,995 B1 | | 7/2002 | Shuman | |
| 6,424,997 B1 | | 7/2002 | Buskirk, Jr. et al. | |
| 6,430,615 B1 | * | 8/2002 | Hellerstein et al. | 709/224 |
| 6,434,435 B1 | * | 8/2002 | Tubel et al. | 700/30 |
| 6,442,542 B1 | | 8/2002 | Ramani et al. | |
| 6,442,589 B1 | | 8/2002 | Takahashi et al. | |
| 6,460,074 B1 | | 10/2002 | Fishkin | |
| 6,490,572 B1 | * | 12/2002 | Akkiraju et al. | 706/19 |
| 6,493,694 B1 | | 12/2002 | Xu et al. | |
| 6,496,853 B1 | | 12/2002 | Klein | |
| 6,507,872 B1 | * | 1/2003 | Geshwind | 709/236 |
| 6,513,026 B1 | | 1/2003 | Horvitz et al. | |
| 6,535,795 B1 | * | 3/2003 | Schroeder et al. | 700/266 |
| 6,560,330 B1 | | 5/2003 | Gabriel | |
| 6,594,697 B1 | * | 7/2003 | Praitis et al. | 709/225 |
| 6,611,535 B1 | | 8/2003 | Ljungqvist | |
| 6,615,172 B1 | * | 9/2003 | Bennett et al. | 704/257 |
| 6,618,727 B1 | * | 9/2003 | Wheeler et al. | 707/10 |
| 6,654,726 B1 | | 11/2003 | Hanzek | |
| 6,738,759 B1 | * | 5/2004 | Wheeler et al. | 707/3 |
| 6,748,387 B1 | | 6/2004 | Garber et al. | |
| 6,850,513 B1 | * | 2/2005 | Pelissier | 370/351 |
| 6,915,344 B1 | * | 7/2005 | Rowe et al. | 709/224 |
| 2001/0027463 A1 | | 10/2001 | Kobayashi | |
| 2001/0042090 A1 | | 11/2001 | Williams | |
| 2001/0056456 A1 | | 12/2001 | Cota-Robles | |
| 2002/0032715 A1 | | 3/2002 | Utsumi | |
| 2002/0052907 A1 | | 5/2002 | Wakai et al. | |
| 2002/0065953 A1 | | 5/2002 | Alford et al. | |
| 2002/0073129 A1 | | 6/2002 | Wang et al. | |
| 2002/0078119 A1 | | 6/2002 | Brenner et al. | |
| 2002/0078121 A1 | | 6/2002 | Ballantyne | |
| 2002/0078257 A1 | | 6/2002 | Nishimura | |
| 2002/0083251 A1 | | 6/2002 | Chauvel et al. | |
| 2002/0087618 A1 | | 7/2002 | Bohm et al. | |
| 2002/0087623 A1 | | 7/2002 | Eatough | |
| 2002/0091746 A1 | | 7/2002 | Umberger et al. | |
| 2002/0103871 A1 | | 8/2002 | Pustejovsky | |
| 2002/0107926 A1 | | 8/2002 | Lee | |
| 2002/0116463 A1 | | 8/2002 | Hart | |

FOREIGN PATENT DOCUMENTS

| | | | |
|---|---|---|---|
| JP | 09106296 A | * | 4/1997 |
| WO | WO 00/36487 A2 | | 6/2000 |

OTHER PUBLICATIONS

McKinnon et al; Data Communications and Management of a Distributed Network of Automated Data Acquisition and Analysis Systems; 1997 IEEE Nuclear Science Symposium, vol. 1; Nov. 9-15, 1997; pp. 730-733.*

Parmentier et al; Logical structure recognition of scientific bibliographic references; Proceedings of the Fourth International Conference on Document Analysis and Recognition; vol. 2; Aug. 18-20, 1997; pp. 1072-1076.*

Kalogeraki et al; Using multiple feedback loops for object profiling, scheduling and migration in soft real-time distributed object systems; IEEE Int'l Symposium on Object-Oriented Real-Time Distributed Computing Proceedings; May 2-5, 1999; pp. 291-300.*

Johnson et al; Adaptive model-based neural network control; IEEE International Conference on Robotics and Automation Proceedings; May 13-18, 1990; pp. 1704-1709, vol. 3.*

Breese et al, "Empirical Analysis of Predictive Algorithms for Collaborative Filtering," Proc. of the 14th Conf. on Uncertainty in Artificial Intelligence, Jul. 1998, 40 pgs.

Czerwinski et al, "Visualizing Implicit Queries for Information Management and Retrieval," Proc. of CHI 1999; ACM SIGCHI Conf. on Human Factors in Computing Systems, 1999, pp. 560-567.

Dumais et al., "Inductive Learning Algorithms and Representations for Task Categorization," Proc. of 7th Intl. Conf. on Information & Knowledge Management, 1998, 8 pgs.

Horvitz, "Principles of Mixed-Initiative User Interfaces," Proc. of CHI 1999; ACM SIGCHI Conf. on Human Factors in Computing Systems, 1999, 8 pgs.

Horvitz et al., "Display of Information for Time-Critical Decision Making," Proc. of the 11th Conf. on Uncertainty in Artificial Intelligence, Jul. 1995, 40 pgs.

Horvitz et al., "The Lumiere Project: Bayesian User Modeling . . . ," Proc. of the 14th Conf. on Uncertainty in Artificial Intelligence, Jul. 1998, 10 pgs.

Horvitz et al., "Time-Dependent Utility and Action Under Uncertainty," Proc. of the 7th Conf. on Uncertainty in Artificial Intelligence, Jul. 1991, 9 pgs.

Horvitz et al., "Time-Critical Action: Representations and Application," Proc. of the 13th Conf. on Uncertainty in Artificial Intelligence, Jul. 1997, 8 pgs.

Koller et al., "Toward Optimal Feature Selection," Proc. of 13th Conf. on Machine Learning, 1996, 9 pgs.

Lieberman, "Letiza: An Agent That Assists in Web Browsing," Proc. of International Joint Conference on Artificial Intelligence, 1995, 6 pgs.

Platt, "Fast Training of Support Vector Machines Using Sequential Minimal Optimization," Advances in Kernel Methods: Support Vector Learning, MIT Press, Cambridge, MA, 1999, pp. 185-208.

Platt, "Probabilistic Outputs for Support Vector Machines & Comparisons to Regularized Likelihood Methods," Adv. in Large Margin Classifiers, MIT Press, Cambridge, MA, 1999, pp. 1-11.

Sahami et al. "A Bayesian Approach to Filtering Junk E-Mail," Amer. Assoc. for Art. Intell. Technical Report WS-98-05, 1998, 8 pgs.

Cohen, "Learning Rules that Classify E-Mail," AT&T Laboratories, 1996, pp. 1-8.

Lewis, "Evaluating and Optimizing Autonomous Text Classification Systems," ACM SIGIR, 1995, pp. 246-254.

Lewis et al., "Training Algorithms for Linear Text Classifiers," ACM SIGIR, 1996, pp. 298-306.

APTE et al., "Automated Learning of Decision Rules for Text Categorization," ACM Transactions on Information Systems, vol. 12, No. 3, 1994, pp. 233-251.

Losee, Jr., "Minimizing Information Overload: The Ranking of Electronic Messages," Journal of Information Science 15, 1989, pp. 179-189.

Joachimes, "Text Categorization with Support Vector Machines: Learning with Many Relevant Features," Universitat Dortmund, Germany, 1998, 6 pgs.

Webster's Third New International Dictionary, G. & C. Merriam Company, 1961, pp. 538, 834, 1460.

Computer Dictionary, Microsoft Press, 1997, Third Edition, p. 192.

* cited by examiner

SYSTEM AND METHOD FOR ELECTRONIC COMMUNICATION MANAGEMENT

CROSS-REFERENCE TO RELATED APPLICATIONS

This application is related to, and claims the benefit of, U.S. Provisional Patent Application Ser. No. 60/176,411, entitled "System and Method for Effective and Efficient Electronic Communication Management," filed Jan. 13, 2000, which is hereby incorporated by reference. This application is also related to U.S. patent application Ser. No. 09/602,588, entitled "System and Method for Automatic Task Prioritization," filed Jun. 21, 2000, and U.S. patent application Ser. No. 09/624,361, entitled "System and Method for Optimizing Timing of Responses to Customer Communications," filed Jul. 24, 2000, which are hereby incorporated by reference.

BACKGROUND OF THE INVENTION

1. Field of the Invention

This invention relates generally to electronic communications and relates more particularly to a system and method for electronic communication management.

2. Description of the Background Art

In a typical organization, communications with customers and others may occur via a variety of different channels. In addition to traditional channels such as letters and telephone calls, customers may also communicate with an organization via electronic mail, facsimile, web-based forms, web-based chat, and wireless communication and voice. An organization will most likely incorporate these and any other newly developed communication channels to allow customers to communicate in a way they find most convenient.

Many of the communication channels mentioned above contain information that is unstructured in nature, usually expressed in natural language. Different customers may make identical requests each in a unique way, using different communication channels, different words, or both. Human agents are usually required to review each natural language communication to evaluate the customer's intent, and to determine what information or action would be responsive to that intent.

Agents typically must look to various sources to gather all of the information required to respond appropriately to a customer communication. The information may be retrieved from a variety of sources, such as legacy systems, databases, back office systems, and front office systems. Each of these sources may store data in a unique structure or format. An agent typically gathers and organizes the required information from one or more of these information sources and uses the information to compose an appropriate content-rich reply that is responsive to the customer's intent.

Utilizing people to respond to customer communications is often rather inefficient. In addition, an increase in the number of communications received by an organization typically requires an exponential increase in the number of people required to provide an acceptable level of customer service.

Several types of automatic systems exist for responding to customer communications. Rule-based systems, keyword-based systems, and statistical systems typically do not perform with the necessary accuracy to substantially automate business processes, such as responding to customer inquiries, and require a large investment in resources to keep them up-to-date. Many learning systems utilize a training set of data that is a poor representation of the system's world, which reduces the accuracy of the system and makes the process of updating the system very cumbersome.

SUMMARY OF INVENTION

The invention provides a system and method for electronic communication management. The system comprises a contact center, a modeling engine, an adaptive knowledge base, and a feedback module. The contact center may send and receive communications via various communication channels including phone, facsimile, electronic mail, web forms, chat, and wireless. The modeling engine analyzes received communications to determine an intent. For received communications containing natural language text, the modeling engine performs morphological, semantic, and other analyses. For voice-based communications, the system performs various digital signal processing tasks.

The adaptive knowledge base stores models that are used to predict responses and actions to the received communications based on the intent identified by the modeling engine. The feedback module monitors actual responses to the received communications and compares them to the predicted responses. If a predicted response is substantially the same as the actual response, the model or models that predicted the response are updated with positive feedback. The feedback module supports multiple feedbacks to a single communication. If a predicted response is substantially different than the actual response, the model or models that predicted the response are updated with negative feedback. The feedback process may be performed either in real time or off-line. Each model has an internal accuracy gauge that is updated by the feedback. The system learns from every communication that is processed.

The modeling engine may also support various application specific modules, for example, an automatic response module, an automatic task prioritization module, an expertise based routing module, a content filter, a workflow application module, and a business process automation module. The modeling engine may also retrieve data from various sources, such as databases and back office systems, which relate to the intent of a communication.

The contact center converts each received communication into a universal data model format. The models in the adaptive knowledge base may also be expressed in the universal data model format, so that models of different types of data may be compared to each other.

DETAILED DESCRIPTION OF THE INVENTION

Figure 1:
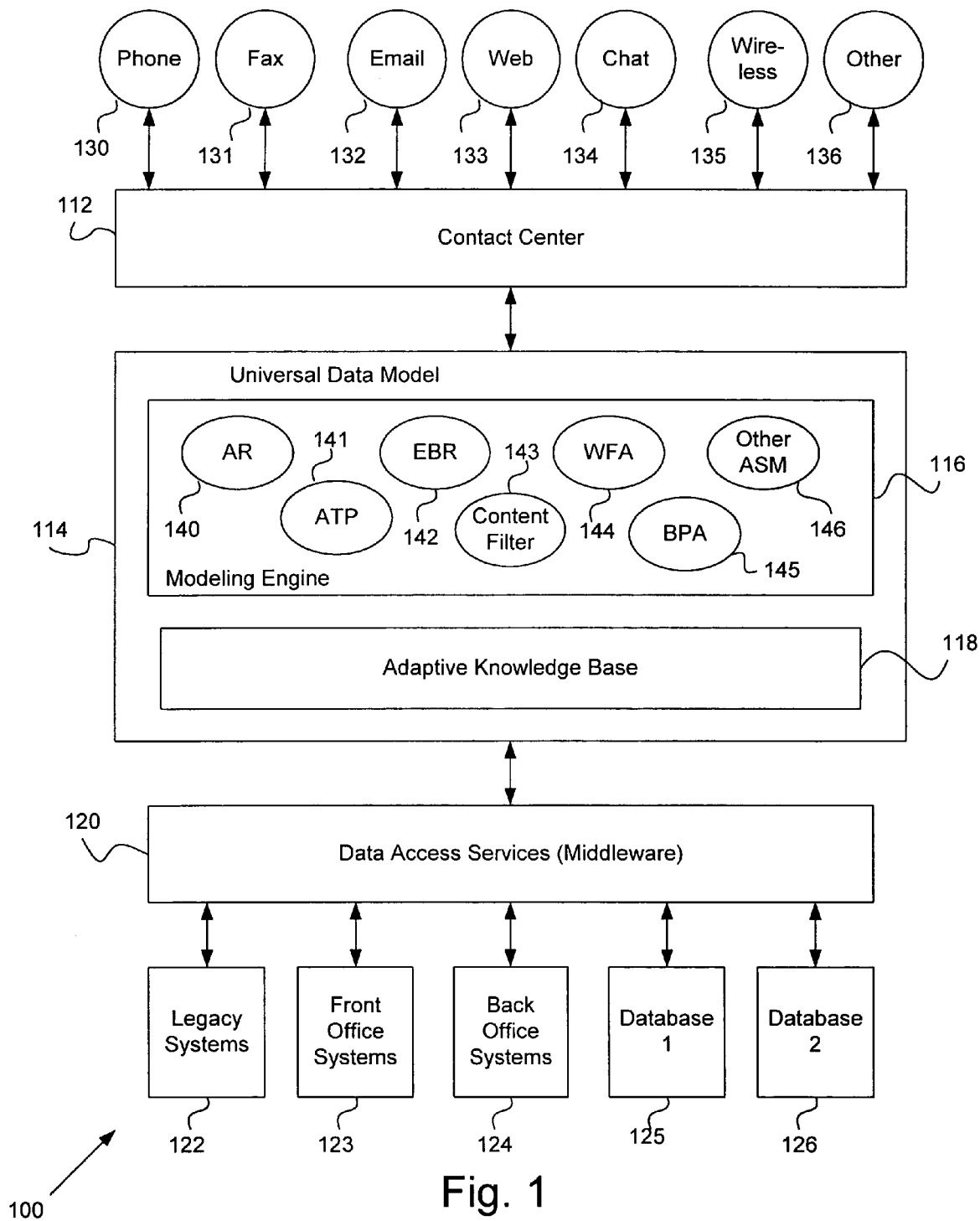
FIG. 1 is a block diagram for one embodiment of an electronic communications system, according to the present invention.

Referring now to FIG. 1, a block diagram of an electronic communication management system 100 is shown. System 100 includes, but is not limited to, a contact center 112, a universal data model 114, a modeling engine 116, an adaptive knowledge base 118, and data access services 120. Contact center 112 receives communications from a variety of channels. The channels include, but are not limited to, telephone 130, facsimile 131, electronic mail (Email) 132, web-based communications 133, chat communications 134, and wireless communications 135. Other types of electronic communications 136, for example a file transfer using the File Transfer Protocol (FTP), are within the scope of the present invention. New communication channels may be added without taking the system off-line.

The communications received by contact center 112 typically contain data or information that is unstructured in nature. With the exception of some web-based or other type of electronic forms, the communications usually contain information expressed in natural language. Each individual correspondent may compose a communication in a unique way, even when requesting the same type of information.

System 100 also includes data access services (middleware) 120 that retrieve data from various sources that include, but are not limited to, legacy systems 122, front office systems 123, back office systems 124, and databases 125, 126. These sources typically contain data that are structured, each source potentially having its own data format. Data access services 120 of the present invention translate the data from each source to conform to a universal data model (UDM) 114 format, so that data from the various sources may be represented according to a common data structure. For example, a universal data model of front office data will have the same structure as a model of back office data.

Contact center 112 of the present invention translates incoming communications from the various communication channels to conform to universal data model 114, so that data from the various communication channels may be represented according to a common data structure. For example, a universal data model of a facsimile communication will have the same structure as a model of an email communication with any obviously necessary changes. The universal data model 114 of the present invention allows different types of data to be represented in a common data format, regardless of the source or type of data.

UDM 114 allows system 100 to analyze, model, and compare models of different types of data. System 100 may create and compare models of email communications, models of database information, and models of human agents. System 100 is able to compare a model of an email communication to a model of an agent, which in turn may be compared to a model of a business process because all models have the same universal structure. The universal data model 114 advantageously allows previously incompatible types of information to be processed by the same system. The UDM 114 is a data driven model of information.

In one embodiment of system 100, UDM 114 includes concepts that are produced in a hierarchical processing scheme. Lower level concepts may be as general as single words from email texts, voice data, or may be as specific as field descriptors from a web-based form. Further processing allows system 100 to infer intents and other higher level concepts from the lower level concepts. Thus, a final representation of information in UDM 114 is identical for all information sources.

System 100 also includes a modeling engine (ME) 116. ME 116 is a tool that, in conjunction with UDM 114, allows system 100 to perform a myriad of tasks using data from various sources. ME 116 supports various Application Specific Modules (ASM) 140–146. The ASMs perform specialized operations using ME 116 in conjunction with models and information in the universal data format, and are discussed in further detail below.

To be able to support the ASMs, ME 116 monitors relationship events and business processes, and looks for semantical and other patterns. Relationship events are any communications between the organization and other external or internal entities. Relationship events may, for example, include an email from a customer, an order placed via a secure web-based ordering system, an email sent from a queue to an agent, a document submitted to a document management system, and an automatic email response sent to a customer.

ME 116 builds semantical models based on relationship events. ME 116 continuously updates the models using positive and negative feedback (explicit or implicit) from system 100, and stores the models in Adaptive Knowledge Base (AKB) 118. Using the models, ME 116 learns the business processes of the system. The models in AKB 118 have strong predictive powers. Given a relationship event, a model is able to predict which other relationship events are likely to follow. For example, given an inquiry, system 100 can predict what is the most likely business response, such as answer, routing, or data association.

ME 116 monitors what business processes follow from a relationship event and determines whether these processes match a model's predictions. A response that matches the prediction is positive feedback that increases the model's accuracy rating, and a response that does not match the prediction is negative feedback that decreases the model's accuracy rating. Both positive and negative feedback adapts AKB 118. Feedback in the present invention is further discussed below in conjunction with FIG. 4.

ME 116 knows when it knows, and knows when it doesn't know, based on measured correlations between confirmed and unconfirmed predictions. ME 116 analyzes a relationship event and is able to recognize when the relationship event corresponds to a model in AKB 118 and when the event does not correspond to a model, or corresponds to a low-dependability model. When a relationship event does not correspond to a model, ME 116 will typically route the event for handling by an agent, and then create a potential new model based on the event, or use predefined rules.

Since received communications are translated into the universal data format, ME 116 is able to learn from feedback for one communication channel and apply that knowledge to another communication channel. For example, feedback from an agent responding to inquiries received via Email 132 may result in knowledge that allows system 100 to automatically answer inquiries on a chat 134 channel, without reconfiguration of system 100.

AKB 118 organizes the models into various categories. Logically related categories are associated with a branch, which in turn may be associated with a branch of larger scope. Using similar statistical techniques to the ones described, creation of the hierarchies can be either manual (via a configuration tool or API) or automatic by monitoring feedback. In addition, some branches may be created with associated rules, which allows system 100 to be fine tuned and to detect non-business-compliant agent actions (e.g., submission of a secure communication over an unsecured communication channel).

AKB 118 may also include flat hierarchies as a special case of tree hierarchies. Other types of graphs, such as a cyclic layered graph, are within the scope of the invention. Incorporating relationship events into the branches of AKB 118 improves the predictive confidence of the branches. As new relationship events are received, new categories are created and new branches develop in AKB 118. The models are used to identify the underlying intent of a relationship event, and to categorize the event based on various criteria, some of which are manual (based on rules) and others which are automatic (based on learning or training). AKB 118 categorizes events using a meta-language that is able to combine manual and automatic criteria.

ME 116 creates branches in AKB 118 using a semi-automatic process. At system start-up, the branching process is given information regarding the tasks or applications system 100 is to support, and some general guidelines on how to differentiate between them. The guidelines typically include hard rules combined with intent-based rules.

When system 100 is up and running, ME 116 uses feedback to modify the branches in AKB 118. ME 116 collects statistical data for intent-based branches, alerts system 100 when hard rules are violated, and monitors the performance of AKB 118. ME 116 also suggests structural changes to AKB 118. ME 116 may join branches that have similar statistical profiles. ME 116 may split branches into sub-branches using a modified expectation maximization process to increase the overall performance of system 100. ME 116 may also perform all of the above operations on a flat structure without branches.

Figure 2:
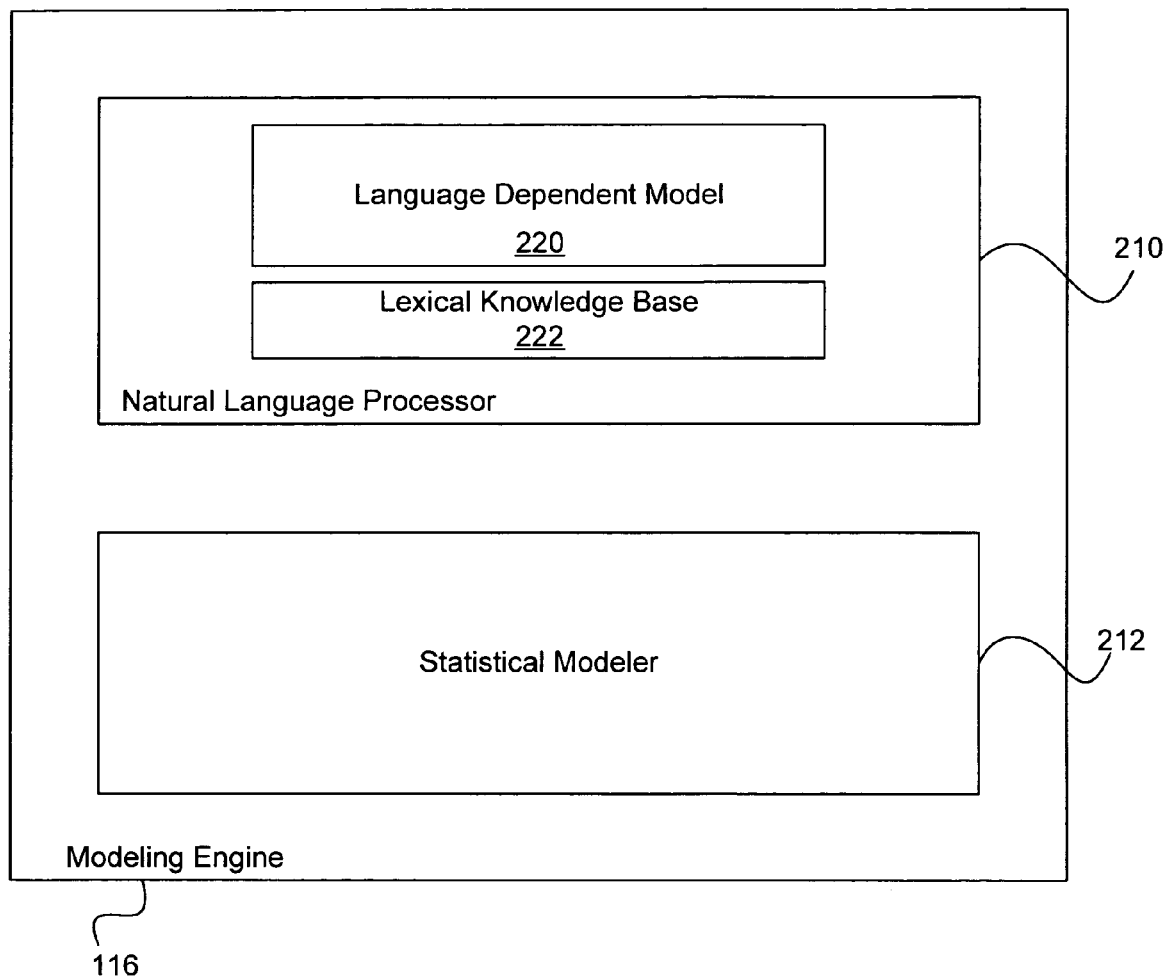
FIG. 2 is a block diagram for one embodiment of the Modeling Engine of FIG. 1, according to the present invention.

Referring now to FIG. 2, a block diagram of ME 116 is shown, according to one embodiment of the present invention. ME 116 includes, but is not limited to, a Natural Language Processor (NLP) 210, and a Statistical Modeler 212. Natural Language Processor 210 evaluates customer communications in natural language to determine the customer's intent and other relevant information. Data structures such as fixed fields in a web-based form are considered a subset of natural language.

NLP 210 includes, but is not limited to, a Language Dependent Module (LDM) 220 that extracts information from a natural language communication, and a Lexical Knowledge Base (LKB) 222 that include lexical, morphological, and semantic information. NLP 210 may identify the language of the communication and have separate LDMs 220 and dictionaries for various languages that operate simultaneously. LDM 220 identifies the content-rich parts of the relationship event, and corrects spelling and grammatical errors. In fact, LDM 220 expects poor grammar and broken text in relationship events, and does not rely upon accurate grammar to perform sentence analysis, which improves the accuracy of system 100.

LDM 220 performs text analysis using context rules. Some context rules are rigid rules and others are learned statistically from actual texts collected from previous relationship events. Grammar errors and broken text have only a "local" influence on the entire text analysis. Common errors are learned and are referred to as non-rigid rules.

LDM 220 may be modified to parse and understand specific classes of grammatical and syntactic errors that are characteristic of speakers of a particular non-native language. For example, a native German speaker writing in English may connect adjectives together as one word. LDM 220 will recognize this type of error as one commonly made by native German speakers, and correct the error accordingly.

NLP 210 also collects other types of information about a relationship event. This information may include the use of passive voice, semantic information, contextual information, morphological information, and quantitative information. The quantitative information may include the number of sentences or number of exclamation points. NLP 210 identifies key concepts in a relationship event, which are basic components of language information. These components include, but are not limited to, sentences, words, stems, semantically significant constructs, the type and number of punctuation marks, strong use of the passive voice, dates, and currency amounts.

NLP 210 also identifies the modality of text from any text channel. NLP 210 identifies modes that include, but are not limited to, emotive language, the age or education of the writer, indications of large sums of money, and offensive content. NLP 210 also may identify the type of communication, for example inquiry, request, complaint, formal letter, resume, joke communication, and junk mail.

NLP 210 also includes Lexical Knowledge Base (LKB) 222. LKB 222 includes lexical, morphological, and semantic domains. The information in LKB 222 may be either general or domain dependent. LKB 222 may include, but is not limited to, a lexicon, a thesaurus, a spell checker, a morphological analyzer, and a tagger.

LKB 222 may be constructed off-line using predetermined semantical data, and may accumulate semantical data on-line by monitoring user actions. The semantic domain of LKB 222 is the main resource for ME 116 in creating meaningful models.

NLP 210 builds semantic models for relationship events using concepts described in or otherwise suggested by the event and the relationships between the concepts. As a very simple example, the statement "The book is on the table" contains the concepts "book" and "table." A semantic model would include these two concepts and show their relationship of one being "on" the other. NLP 210 also generalizes concepts based on feedback. For example, the statement "the book is on the table" could be generalized to a model that describes a written object on a piece of furniture. Thus, the statement "the newspaper is on the chair" could result in the same generalized model.

The second main component of ME 116 is the Statistical Modeler 212. Modeler 212 is used in training the system and creating models in conjunction with NLP 210. Statistical modeler 212 performs relationship algebra using the models in Adaptive Knowledge Base 118. Relationship algebra compares and modifies models.

For example, model A and model B represent business processes. If model A is compared to model B, a statistical score may be 70%. "Adding" model A with model B produces a new model A' (A+B=A'). If model A' is compared to model B, the statistical score may be 72%. By combining model B with model A, the resulting model A' is a little more like model B. "Subtracting" model B from model A produces another new model A" (A−B=A"). If model A" is compared to model B, the statistical score may be 68%. Thus model A" is a little less like model B. ME 116 uses these and other types of relationship algebra operations to continuously update models. Feedback determines which operations are performed with the models. System 100 may expect some erroneous feedback, so not every operation necessarily directly affects the models. In some cases, ME 116 will look for supportive evidence before a particular action is incorporated into a model.

ME 116 maintains internal queues of potential models and potential concepts that are not in actual usage by system 100. ME 116 continuously checks and updates these potential models and concepts. ME 116 automatically collects domain knowledge, which is information about the world in which it lives. ME 116 creates the potential, or hypothetical, models when it sees a pattern of relationship events in the system. ME 116 tests these hypothetical models and incorporates data into the models when the data is deemed sufficiently accurate.

There are two potential main sources for loss of accuracy of models in a modeling system. The first source is variance, where there is not enough data to support a model. The second source is bias, where there are false beliefs about the data. ME 116 is capable of distinguishing between these two sources for loss of accuracy, and is able to accurately assess the amount of data that supports each model. ME 116 may thus decide when the data is sufficiently rich to support predictive use of a model.

Each model in Adaptive Knowledge Base 118 has an internal accuracy gauge that is updated continuously by feedback from the system. Positive feedback increases a model's accuracy rating, and negative feedback decreases the model's accuracy rating. Each model compares its prediction with the actual result or action of the system and responsively modifies its accuracy rating accordingly.

A model's accuracy is rated by recall and precision. A model's recall is the ratio of the number of events the model identified to the number of events the model should have identified. A model's precision is the ratio of the number of events the model identified correctly to the number of events the model identified. Recall and precision may be traded against one another. For example, high recall can be achieved by indiscriminately identifying all events, however this results in loss of precision. Alternatively, high precision can be achieved by identifying events for which the model has high confidence, but some events may be missed and recall would be lower. A good model should have high recall and high precision. Recall and precision measurements may be assessed using feedback from system 100. A statistical matching value between documents and models may also be evaluated by a calculated statistical likelihood value. The likelihood value may be calculated using an adaptive kernel method based on match value results of various categories.

For each branch, AKB 118 gathers statistical data that distinguishes the branch model from its background using significant concepts. AKB 118 contains two types of data, active concepts and candidate concepts that may become active in the future. Feedback from system 100 is used to update both types of data. Each concept has an associated rate that relates to the difference between its expected contribution in relevant and irrelevant events.

The feedback process modifies the rates of the concepts. Each newly modified rate determines whether a candidate concept should become active, and whether an active concept should become inactive. The contribution of an active concept to branch classification is based on a log-likelihood-ratio between two statistical models that are built by interpolating the statistical data of the relevant models and the irrelevant models.

If a model's accuracy rating drops below a predetermined threshold, the model is marked as inaccurate and is not used by the system to make decisions. However, the model still receives data and makes predictions, which are compared to the actual performance of the system. The model continues to receive feedback and the accuracy rating continues to be updated. Use of the model will be resumed if and when the model regains an accuracy rating above the predetermined threshold.

When a model is being disregarded, the system may behave according to some predetermined rules, use keywords, or perform some other action like sending relationship events to a queue for processing by a human agent.

As ME 116 learns the business processes of the system, it becomes able to identify erroneous or malicious input by an agent. An agent may make errors that unintentionally damage the accuracy of the system, or may intentionally take incorrect actions to deliberately sabotage the accuracy of the system. ME 116 can identify responses made by agents that do not fit the patterns predicted by the models. ME 116 identifies these responses by analyzing feedback that is very different from the system's predictions. Suspicious responses are identified according to the reliability of the origin of the response, and the difference between the system's decision and the feedback. ME 116 analyzes feedback according to its origin and will trace suspicious feedback, then obtain verification before using the feedback.

There are several ways in which ME 116 may be trained when a system initially goes on-line at an organization. In one embodiment, ME 116 is placed on-line with no active models. The system then receives live relationship events and begins building models. The accuracy of the models' predictions will increase as the number of relationship events increases.

In another embodiment, ME 116 receives historical relationship event data and builds models based on this data. Thus, ME 116 may be placed on-line with models in place that will be fairly accurate if the historical relationship event data is a fair representation of live relationship events.

In a further embodiment, ME 116 is placed on-line with no active models, and the system behaves according to a set of rules or logical expressions. ME 116 builds models based on live relationship events while the rules are in place. When the models reach an acceptable level of accuracy, the rules are automatically disregarded and the models take over the processing of events. If a model becomes inaccurate, the system may default back to the rules until the model becomes accurate again.

Returning to FIG. 1, one of the Application Specific Modules supported by ME 116 is an Automatic Response (AR) module 140. This module automatically composes and sends an appropriate pre-written or "canned" response to a customer communication. Exemplary responses may contain general information about the organization, a request for more information from the customer, or a confirmation that the communication was received. A related response module may compose relevant content-rich responses to customer communications using fragments of existing text and retrieved data, with or without the involvement of human agents. For example, an automatic response concerning a customer's account balance may contain a pre-existing text message with the appropriate amount inserted into the message. An automatic response may also be a combination of multiple fragments identified by ME 116. ME 116 analyzes the customer's message to identify intents and/or categories. ME 116 then fetches data, for example an account balance or order status, and a pre-existing text message associated with the appropriate category.

Another module is an Expertise Based Routing (EBR) module 142 that routes a customer communication to the agent or queue best qualified to perform the required task or solve the customer's problem. EBR 142 compares a model of the relationship event (e.g., customer facsimile or wireless communication) with models of all available agents or queues to determine which agent is best suited for responding to the event, and then routes the event to that agent or queue. An agent's model may include, but is not limited to, the agent's seniority, automatically detected areas of competency, and languages.

Automatic Task Prioritization (ATP) module 141 is another module that is supported by ME 116. ATP 141 prioritizes tasks and learns from feedback and rules which tasks have a higher priority than others. Priority may be determined based on a service level agreement with the particular customer, dollar amounts mentioned in the communication, the type of information being requested by the customer, or other content of a customer communication. ATP 141 may be customized to make priority decisions according to an organization's specifications.

ME 116 also may support a content filter module 143 that filters responses composed by agents. Content filter 143 may be used to avoid emotive or rude replies to customers, and as a method for assessing the quality of the responses. Content filter 143 may also be used to ensure compliance with an organization's regulations. In another embodiment, content filter 143 may filter customer communications for emotive or offensive content, and route these communications to a queue for handling by a senior agent.

Business Process Automation (BPA) modules 145 may be used to complete routine business processes automatically. For example, a transfer of funds between a customer's accounts in a financial institution may be handled automatically, or monthly shipments of a product from a retailer may be processed automatically for customers with standing orders. An automatic business process may be performed using data retrieved from various sources internal to the organization. Thus, a legacy system and a database having different data structures may exchange data via a BPA module 145 supported by ME 116.

Other modules that may be supported by ME 116 are Workflow Applications (WFA) 144, which allow agents to escalate relationship events, reassign events, or add comments to messages. ME 116 may support other ASMs 146 that an organization may require, such as automatic fetching of data and/or agents needed to solve a particular problem, building a team of skilled agents according to the needs of a task, suggesting internal recipients for a communication within an organization, and detecting "hot prospects."

Another ASM may automatically generate relevant Frequently Asked Questions (FAQ) that are responsive to a customer's intent. The module, in conjunction with ME 116, determines the intent or intents of the customer, selects from a general list the most relevant FAQs, and incorporates them into a response sent to the customer. Yet another module may post an automatic response to a relationship event on a website and send a customized URL to the customer so that, among other things, the system can track if and when the response was accessed.

Another Application Specific Module may generally classify communications and documents based on content. Customer communications that may not require a response, for example responses to customer surveys, and other electronic documents, such as directives from management to agents, may be classified by content and automatically stored in an appropriate file or database. For instance, this module may identify extremely negative survey responses and forward them to a queue for further evaluation by management.

Other Application Specific Modules that an organization desires may be built and incorporated into an existing system without taking the system off-line. Thus, each system may be customized to meet the needs of a specific organization and may be updated and modified as the organization's needs change.

Figure 3:
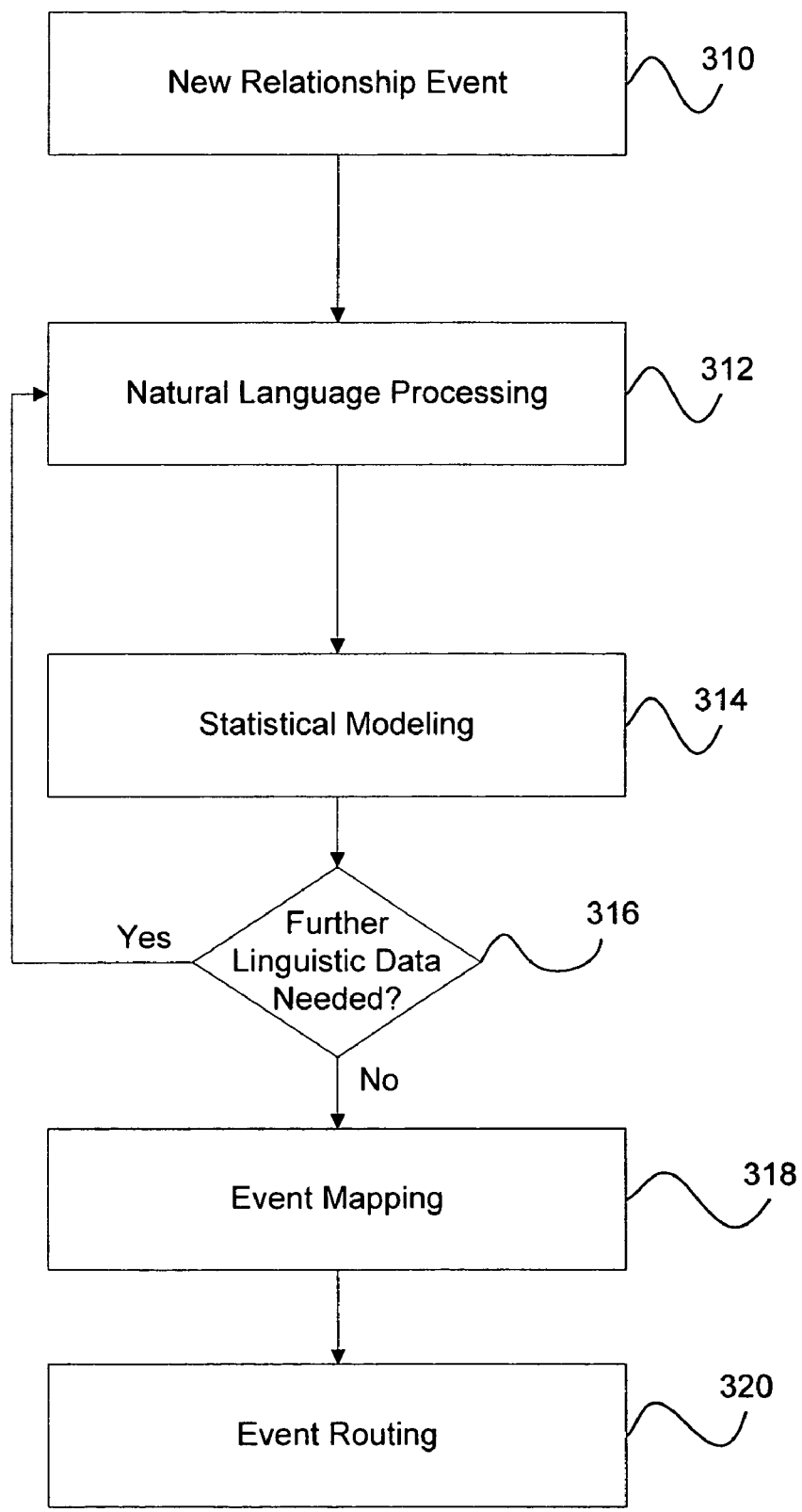
FIG. 3 is a flowchart of method steps for processing relationship events, according to one embodiment of the present invention.

Referring now to FIG. 3, a flowchart of method steps for processing a relationship event is shown, according to one embodiment of the present invention. In the FIG. 3 embodiment, the new relationship event is received via a text-based channel such as email.

In step 310, system 100 receives a new relationship event, which is translated into a universal data model by contact center 112, and is then routed to ME 116. In step 312, the Natural Language Processor 210 analyzes the event to identify concepts, utilizing linguistic data from Adaptive Knowledge Base 118. NLP 210 may perform various analyses on the event, including semantic, contextual, morphological, and quantitative.

Next, in step 314, the concepts are used to build a model for the event using statistical modeling and modeler 212, as discussed above. In step 316, modeler 212 determines whether it needs further linguistic information for the event. If so, the method returns to step 312 for additional natural language processing. If not, the method continues with step 318, where ME 116 maps the event model to all models in AKB 118 to determine the relevancy of the event to each category. The event mapping step assigns a score to every category for each relationship event based on how closely the model for the relationship event corresponds to a category's models. The score is determined by comparing the models using the relationship algebra described above. In other embodiments, logical expressions (rules) are used to categorize events. These rules may also be used when models are considered inaccurate.

Next, in step 320, the event is routed for automatic or semi-automatic action, based on the category scores and configuration settings. An event may be routed to certain queues or agents if the corresponding category score is greater than a predetermined threshold. The user (manager) of system 100 may set these thresholds and vary them at any time to best suit the needs of the organization. Alternatively, the threshold values may be set automatically based on information from the system itself.

Relationship events received via a voice channel are processed slightly differently. Voice events may be initially handled by an agent who determines the customer's intent. The agent is presented with a tree showing topics of various customer intents. The agent chooses an appropriate topic or topics, and the system then fetches data and canned responses corresponding to the selected topic.

Voice events may also be processed by a digital signal processing (DSP) module that categorizes events based on the acoustical content of an audio signal. The module compares a received voice event to models of previous events to predict an appropriate action, including transmitting a pre-recorded vocal response. Voice events may be processed in real time, or may be stored as voice mail messages and processed off-line. In the preferred embodiment, the voice events are not transformed into text before being categorized. Agent feedback may be used to refine the models of acoustical patterns.

Figure 4:
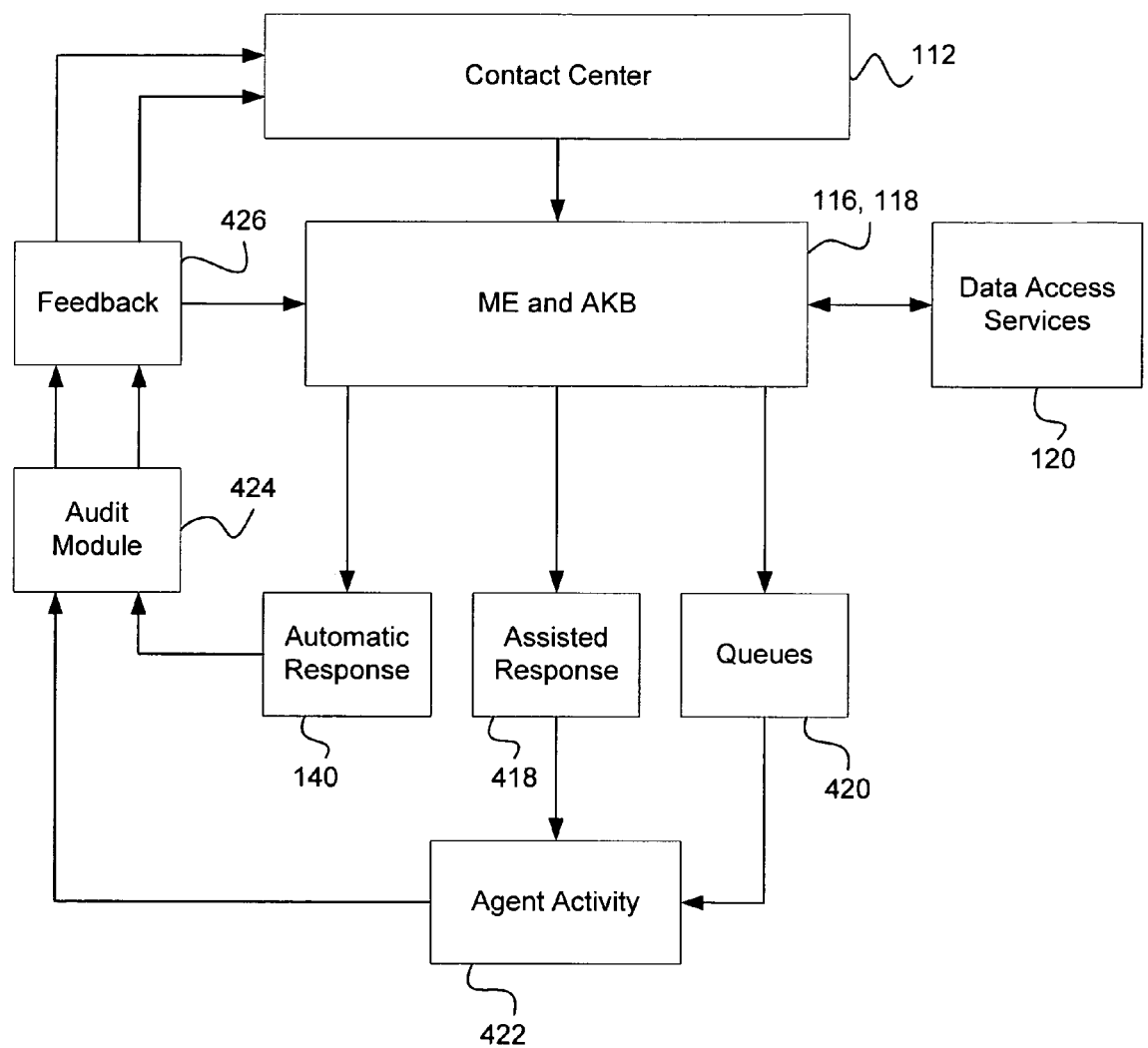
FIG. 4 is a diagram of relationship event processing, according to one embodiment of the present invention.

Referring now to FIG. 4, a diagram of relationship event processing is shown, according to one embodiment of the present invention. A relationship event is received in the contact center 112 and translated into the universal data format. The event is then processed by the Modeling engine (ME) 116 in conjunction with the Adaptive Knowledge Base (AKB), as described above in conjunction with FIGS. 2 and 3. ME 116 accesses any required data from data access services 120 and forwards the event model and data for further processing.

ME 116 may forward the event model and data to an automatic response module 140, an assisted response module 418, or a queue 420. The present invention may also include other modules, as described above in conjunction with FIG. 1. ME 116 may forward the event model to as many modules as needed to respond to all of the intents expressed in the event.

The automatic response module 140 generates an appropriate automatic response and forwards the response to an audit module 424. The audit module 424 may or may not perform an audit on the response, as will be described below. If an audit is performed, the result is then forwarded to a feedback module 426, where feedback is sent to ME 116. This feedback from an automatic response will most likely be positive feedback that strengthens the accuracy rating of the model that selected the response. The automatic response is then sent to the contact center 112, where the response is formatted for the appropriate communication channel and sent to the customer. Feedback module 426 supports multiple feedbacks to a single communication.

The assisted response module 418 will forward the event model, the associated information gathered by ME 116 including a history of interactions with the customer, and a list of suggested (canned) responses to the event to an agent 422. The agent 422 may select one or more of the suggested responses, or may compose an original response. The response is forwarded to the audit module 424, which may or may not perform an audit on the response. The response then flows to the feedback module 426, which provides the response feedback to ME 116.

The feedback system of the present invention performs two separate processes: updates the structure of models in AKB 118 and adjusts the models' accuracy ratings. The feedback from feedback module 426 may be positive or negative. If the agent selected one of the suggested responses, the model that predicted that response will be updated and its accuracy rating will increase since its feedback was positive. The models that predicted other responses will also be updated, and their accuracy ratings will decrease since their predictions were not implemented, thus their feedback was negative. If the agent composed an original response, some or all of the models will receive negative feedback.

Relationship events and associated data may be sent to one or more queues 420 by ME 116. Queues may store events of low priority until events of high priority have been processed. Other queues may store events that contain more than one request. For instance, a customer may request information regarding an existing account and express an interest in a new account. The first request may be satisfied with an automatic response, but the second request may be sent to a queue for new accounts. The second request may then be forwarded to an agent who handles new accounts.

The present invention includes built-in quality control based on audits of responses to relationship events. The audit module 424 reviews responses to relationship events and feeds this information back to ME 116 via the feedback module 426. ME 116 may determine that a particular agent assisted response was inappropriate if the response varies greatly from what was predicted. The system user may configure the audit module 424 to perform audits based on various criteria, including, but not limited to, the experience level of agents, the status of the customer based on a service level agreement, which queue the event was routed to, the channel of the event, the type of response, and whether the agent sent a canned or a composed response.

The learning capabilities of ME 116 allow the system to maintain a high level of recall without sacrificing precision. Recall is a ratio of the number of relationship events that are received by the system and the number of events selected for automatic response or automatic action. Precision is a ratio of the number of events selected for automatic response and the number of responses that were correct. In typical systems, when a system is instructed to increase the number of events that will be responded to automatically, the precision of the system decreases noticeably. When recall is increased, the system will select events for automatic response in which the system has lower confidence. This results in a higher potential for errors in selecting appropriate responses, which lowers the system's precision.

In the system of the present invention, ME 116 allows system 100 to automatically respond to a large number of relationship events correctly. ME 116 quickly learns from feedback which responses are appropriate for various intents, and automatically creates new models as new types of relationship events are received. Thus, system 100 may be instructed to increase the number of events selected for automatic response without causing a significant loss of precision.

Loss of precision usually occurs because the "world" a system lives in is continuously changing. A static rule-based or keyword-based system becomes less accurate over time. In contrast, ME 116 learns and adapts with every relationship event that it sees, thus maintaining a high level of accuracy over time.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. The present invention, which is limited only by the appended claims, is intended to cover these and other variations upon the preferred embodiment.

What is claimed is:

1. A system for electronic communication management comprising:

a contact center configured to send and receive communications using dissimilar communications channels;

a modeling engine configured to analyze a communication received by the contact center on a communications channel and determine an intent of the received communication, wherein the modeling engine is configured to automatically retrieve a model based on the intent of the received communication;

an automatic response module supported by the modeling engine that generates a predicted response to the received communication using the retrieved model;

an agent that composes an actual response to the received communication based on the intent of the received communication;

an adaptive knowledge base configured to store the models used by the modeling engine; and a feedback module configured to compare the actual response to the received communication with the predicted response to the received communication and provide feedback to the modeling engine, which uses the feedback to continuously update the models in the adaptive knowledge base, so as to improve subsequent predicted responses to received communications.

2. The system of claim 1, wherein the contact center is configured to send and receive communications via text-based communication channels.

3. The system of claim 1, wherein the contact center is configured to send and receive communications via voice-based communication channels.

4. The system of claim 1, wherein the contact center is configured to receive text communications comprising natural language.

5. The system of claim 4, wherein the modeling engine comprises a natural language processor configured to analyze the text communications to identify concepts.

6. The system of claim 5, wherein the natural language processor performs a morphological analysis of the text communications.

7. The system of claim 5, wherein the natural language processor performs a semantic analysis of the text communications.

8. The system of claim 5, wherein the natural language processor comprises a lexical knowledge base.

9. The system of claim 1, wherein the contact center is configured to convert received communications into a universal data model format.

10. The system of claim 1, further comprising an audit module configured to monitor responses generated by agents for quality.

11. The system of claim 10, wherein the audit module is configured to generate an audit result that is fed back to the modeling engine.

12. The system of claim 1, wherein each of the models in the adaptive knowledge base comprises an accuracy gauge configured to be updated by feedback.

13. The system of claim 12, wherein the adaptive knowledge base comprises models for active concepts and models for inactive concepts.

14. The system of claim 13, wherein the models for active concepts become inactive when they have a sufficiently low accuracy rating.

15. The system of claim 13, wherein the models for inactive concepts become active when they have a sufficiently high accuracy rating.

16. The system of claim 1, wherein the models in the adaptive knowledge base are organized into categories and the categories are associated with branches.

17. The system of claim 16, wherein the modeling engine is configured to modify the branches in the adaptive knowledge base using the feedback from the feedback module.

18. The system of claim 16, wherein hierarchies of the branches in the adaptive knowledge base comprise manually created hierarchies.

19. The system of claim 16, wherein hierarchies of the branches in the adaptive knowledge base comprise automatically created hierarchies.

20. The system of claim 16, wherein the branches in the adaptive knowledge base have associated rules.

21. The system of claim 1, wherein the modeling engine comprises a statistical modeler configured to create the models and perform relationship algebra using the models.

22. The system of claim 1, wherein the modeling engine is configured to support an application specific module.

23. The system of claim 22, wherein the application specific module is an automatic response module.

24. The system of claim 22, wherein the application specific module is an expertise routing module.

25. The system of claim 22, wherein the application specific module is an automatic task prioritization module.

26. The system of claim 22, wherein the application specific module is a content filter module configured to filter content of agent-generated responses.

27. The system of claim 22, wherein the application specific module is a business process automation module.

28. The system of claim 22, wherein the application specific module is a workflow application.

29. The system of claim 22, wherein the application specific module is a Frequently Asked Questions module.

30. The system of claim 22, wherein the application specific module is configured to generally classify the received communications according to content.

31. The system of claim 2, further comprising a digital signal processing module configured to process received voice communications.

32. The system of claim 31, wherein the digital signal processing module is further configured to categorize the received voice communications according to acoustical content of the received voice communications.

33. The system of claim 1, wherein the feedback module is further configured to support multiple feedbacks to a single received communication.

34. The system of claim 1, wherein the received communications comprise documents.

35. The system of claim 34, wherein a statistical matching value between the documents and the models is evaluated by a calculated statistical likelihood value.

36. A method for managing electronic communications in a computer network, the method comprising:
receiving a communication from one of a plurality of dissimilar communications channels over the computer network;
analyzing the communication at a computer coupled to the computer network to determine an intent of the communication, and automatically retrieving a model based on the intent of the communication;
generating a predicted response to the communication using the retrieved model;
generating an actual response to the communication based on the intent of the communication; and
comparing the actual response to the predicted response to provide feedback, which is used to update the model, so as to improve subsequent predicted responses to communications received over the computer network.

37. The method of claim 36, further comprising routing the communication based on semantical content of the communication.

38. The method of claim 36, wherein the communication comprises a communication expressed in natural language.

39. The method of claim 36, wherein generating a predicted response to the communication comprises comparing the communication to a model.

40. The method of claim 36, wherein generating an actual response is performed by an automatic response module.

41. The method of claim 36, wherein generating an actual response is performed by an agent.

42. The method of claim 36, wherein the communication comprises a text communication comprising natural language.

43. The method of claim 42, wherein analyzing the communication comprises morphological analysis or semantic analysis.

44. The method of claim 36, wherein generating a predicted response to the communication comprises comparing the communication to a set of models that correspond to a category related to the intent of the communication.

45. The method of claim 36, wherein comparing the actual response and the predicted response generates feedback that is used to modify a model.

46. The method of claim 45, wherein if the actual response is similar to the predicted response, the generated feedback is positive, and if the actual response is different from the predicted response, the generated feedback is negative.

47. The method of claim 36, wherein the communication comprises a voice communication expressed in natural language.

48. The method of claim 47, wherein analyzing the communication comprises digital signal processing of the voice communication.

49. The method of claim 48, wherein generating the predicted response to the communication comprises categorizing the voice communication based on acoustical content of the voice communication.

50. A method for processing a relationship event in a computer network, the method comprising:
   receiving the relationship event over the computer network;
   analyzing the relationship event at a computing device coupled to the computer network to identify concepts in the relationship event;
   building an event model of the relationship event using the identified concepts;
   mapping the event model to models in a knowledge base to generate category scores; and
   routing the relationship event over the computer network for action based on the category scores.

51. A computer-readable medium having a program embodied thereon, the program being executable by a computer to perform a method for electronic communication management, the method comprising:
   receiving a communication from one of a plurality of dissimilar communications channels;
   analyzing the communication to determine an intent of the communication, and automatically retrieving a model based on the intent of the communication;
   generating a predicted response to the communication using the retrieved model;
   generating an actual response to the communication based on the intent of the communication; and
   comparing the actual response and the predicted response to provide feedback, which is used to update the model, so as to improve subsequent predicted responses to communications.

52. The computer-readable medium of claim 51, wherein comparing the actual response and the predicted response occurs in real time.

53. The computer-readable medium of claim 51, wherein comparing the actual response and the predicted response occurs off-line.

54. A computer-readable medium having a program embodied thereon, the program being executable by a computer to perform a method for processing a relationship event, the method comprising:
   receiving the relationship event;
   analyzing the relationship event to identify concepts in the relationship event;
   building an event model of the relationship event using the concepts;
   mapping the event model to models in a knowledge base to generate category scores; and
   routing the relationship event over the computer network for action based on the category scores.

55. A system for electronic communication management, comprising:
   means for receiving a communication from one of a plurality of dissimilar communications channels;
   means for analyzing the communication to determine intent, and automatically retrieving a model based on the intent of the communication;
   means for predicting a response to the communication using the retrieved model, and for generating a predicted response;
   means for preparing a response to the communication based on the intent of the communication, and for generating an actual response; and
   means for comparing the actual response and the predicted response to provide feedback, which is used to update the model, so as to improve subsequent predictions.

56. A system for electronic communication management, comprising:
   a contact center configured to send and receive communications via dissimilar communication channels;
   a modeling engine configured to analyze a received communication to determine an intent, and further configured to retrieve a model based on the intent;
   an adaptive knowledge base configured to store models; and
   a feedback module configured to compare a response predicted by the modeling engine in conjunction with the models in the adaptive knowledge base and an actual response to the received communication to generate feedback, the feedback being used to continuously update the models in the adaptive knowledge base such that the system learns from each received communication, in order to improve subsequent predicted responses to received communications.

57. The system of claim 56, wherein the modeling engine gains knowledge from communications on one communication channel and applies the knowledge to communications on another communication channel.

58. A method for computerized analysis of communications using computer-generated adaptive models, comprising:
   receiving a communication via one of a plurality of dissimilar communications channels;
   analyzing content of the communication on a computer to identify at least one concept of the communication;
   creating a model of the communication using the at least one concept;
   comparing the model of the communication to a set of adaptive models to generate a predicted response to the communication using the model
   generating an actual response to the communication based on the concept of the communication;
   comparing the predicted response and the actual response to generate feedback; and
   using the feedback to update at least one of the set of adaptive models such that the set of adaptive models learns with each received communication, in order to improve subsequent predicted responses to received communications.

59. The method of claim 58, wherein comparing the predicted response and the actual response occurs in real time.

60. The method of claim 58, wherein using the feedback to modify at least one of the set of adaptive models occurs in real time.

61. The method of claim 58, wherein comparing the predicted response and the actual response occurs while further communications are being received.

62. The method of claim 58, wherein using the feedback to modify at least one of the set of adaptive models occurs while further communications are being received.

63. The method of claim 58, wherein the content of the communication comprises content expressed in a natural language.

64. The method of claim 58, wherein the content of the communication comprises metadata.

65. The method of claim 58, wherein the content of the communication comprises structured information.

66. The method of claim 58, wherein the communication comprises a text communication.

67. The method of claim 58, wherein the communication comprises a voice communication.

68. A system for electronic communication management, comprising:
 a contact center configured to send and receive communications via dissimilar communications channels;
 an adaptive knowledge base configured to store models;
 a modeling engine configured to analyze a received communication to determine an intent, to prepare a model of the communication based on the intent, and to compare the model of the communication with the models stored in the adaptive knowledge base to generate a predicted response; and
 a feedback module configured to compare the predicted response with an actual response to the received communication to generate feedback used by the adaptive knowledge base to update at least one model such that the system learns from the received communication, in order to improve subsequent predicted responses to received communications.

69. The system of claim 68, wherein a human agent generates the actual response to the received communication.

70. The system of claim 68, wherein the adaptive knowledge base modifies at least one model in response to each communication received by the contact center such that the system learns from each received communication.

71. The system of claim 68, wherein the modeling engine is further configured to determine a plurality of intents in the received communication.

72. The system of claim 71, wherein the modeling engine is further configured to determine an explicit intent and an implicit intent in the received communication.

73. A method for real-time learning in a computerized communication management system, comprising:
 receiving a communication using one of a plurality of dissimilar communications channels;
 creating a model of the communication on a computer;
 comparing the model of the communication to a set of adaptive models to generate a predicted action in response to the communication;
 comparing the predicted action with an actual action in response to the communication to generate feedback; and
 continuously updating the set of adaptive models according to the feedback so as to improve subsequent predicted responses to received communications.

74. The method of claim 73, wherein if the predicted action is similar to the actual action, the feedback is positive and an accuracy rating of a model in the set of adaptive models that generated the predicted action is increased.

75. The method of claim 73, wherein if the predicted action differs from the actual action, the feedback is negative and an accuracy rating of a model in the set of adaptive models that generated the predicted action is decreased.

76. The method of claim 73, wherein if the predicted action differs from the actual action and if a model that is similar to the actual action exists in the set of adaptive models, then the feedback is negative for a model in the set of adaptive models that generated the predicted action and the feedback is positive for the model that is similar to the actual action.

77. A method for real-time modeling of communications in a computerized communication management system, comprising:
 receiving a communication from one of a plurality of dissimilar communications channels;
 creating a model of the communication on a computer;
 comparing the model of the communication to a set of adaptive models to determine a category for the communication;
 comparing the determined category with an actual category for the communication to generate feedback; and
 continuously updating the set of adaptive models according to the feedback, so as to improve subsequent predicted responses to received communications.

* * * * *